United States Patent [19]

O'Connell

[11] 4,004,367
[45] Jan. 25, 1977

[54] DECORATIVE HOLDER FOR FLOWER ARRANGEMENTS

[75] Inventor: Donald L. O'Connell, Port Chester, N.Y.

[73] Assignee: Floral Innovations, Inc., Port Chester, N.Y.

[22] Filed: July 11, 1975

[21] Appl. No.: 595,101

[52] U.S. Cl. .............................. 47/41.12
[51] Int. Cl.² ........................ A01G 5/04
[58] Field of Search .................. 47/4–42, 47/34, 39; 248/27.8; 24/5; D35/3; 428/20–26

[56] References Cited

UNITED STATES PATENTS

| | | | |
|---|---|---|---|
| 2,981,033 | 4/1961 | Cheetwood | 47/41.12 |
| 3,015,406 | 1/1962 | Nolte | 47/41.13 |
| 3,084,666 | 4/1963 | Plaisance | 47/39 X |
| 3,290,820 | 12/1966 | Abersold | 47/41.12 |
| 3,356,326 | 12/1967 | Muren | 47/34 R X |
| 3,651,601 | 3/1972 | La Montagne | 47/41.12 |
| 3,812,617 | 5/1974 | Brody | 47/41 |
| 3,962,825 | 6/1976 | O'Connell | 47/41.12 |

Primary Examiner—Edgar S. Burr
Assistant Examiner—James R. Feyrer
Attorney, Agent, or Firm—Laurence B. Dodds

[57] ABSTRACT

A decorative holder for supporting flower arrangements comprises a flat decorative backing piece having an opening therein and a substantially water-confining receptacle fitting in and extending through the opening for supporting a foam block and having a radially outwardly extending rim engaging the upper surface of the backing piece. The receptacle is double-walled and includes one or more apertures in its upper wall to drain excess water from the foam block supported therein. The receptacle has a plurality of radially inwardly extending ridges for frictionally engaging the foam block to retain it in a desired position in the receptacle. Alternatively or in addition to the retaining ridges, there may be provided a stirrup to engage the foam block and detachably engaging apertures in the rim of the receptacle. Further, there is provided a retaining ring which frictionally engages the receptacle beneath the backing piece and also engages its under surface.

4 Claims, 2 Drawing Figures

DECORATIVE HOLDER FOR FLOWER ARRANGEMENTS

FIELD OF THE INVENTION

The flower holder of the invention is particularly suitable for use by florists in making flower arrangements intended for placing in or on funeral caskets and comprising a flat decorative backing piece on which stems of flowers are secured on or adjacent the surface of the backing piece.

DESCRIPTION OF THE PRIOR ART

A common form of holder for floral arrangements for disposing in or on funeral caskets, particularly such arrangements by professional florists, comprises a decorative backing piece, often in the shape of a heart or a cross, with the stems of the flowers attached to the upper surface of the backing piece. In such an arrangement, the flowers tend to wilt rapidly, often before they have served their intended purpose.

It is an object of the invention to provide a new and improved decorative holder for flower arrangements including provisions for supplying water to the flower stems to prevent premature wilting.

SUMMARY OF THE INVENTION

In accordance with the invention, there is provided a decorative holder for supporting flower arrangements comprising a flat decorative backing piece having an opening therein, a substantially water-confining receptacle fitting in and extending through the opening in the backing piece for supporting a foam block and having extension means engaging the upper surface of the backing piece, means for retaining the foam block in a desired position in the receptacle, and means engaging the receptacle beneath the backing piece for retaining the same in the opening therein.

For a better understanding of the present invention, together with other and further objects thereof, reference is had to the following description, taken in connection with the accompanying drawing, while its scope will be pointed out in the appended claims.

DESCRIPTION OF THE PREFERRED EMBODIMENT

Figure 1:
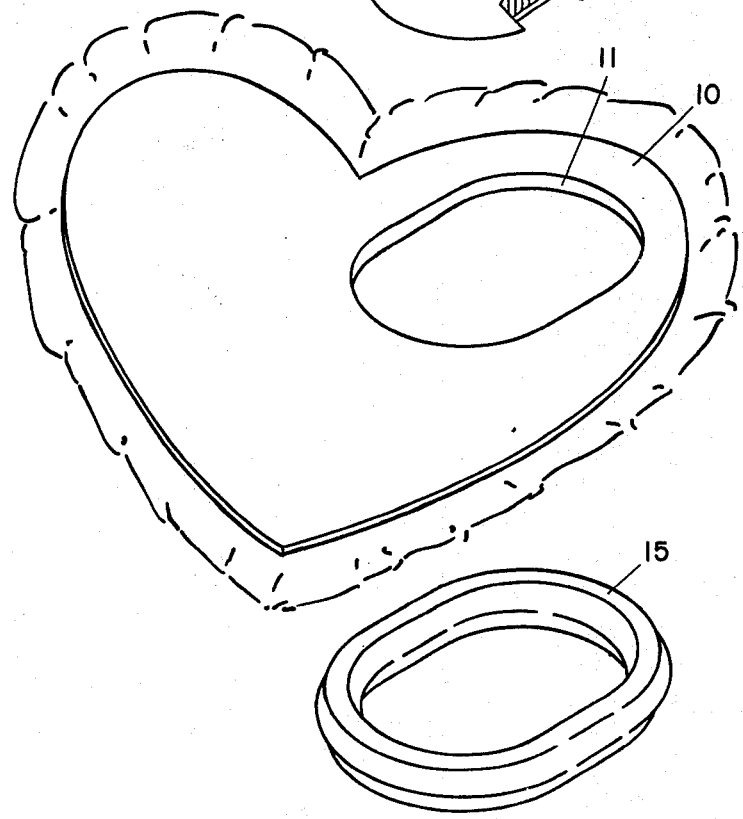
FIG. 1 is an exploded perspective view, partly in section, of a decorative holder for supporting flower arrangements in accordance with the invention.

Referring now to FIG. 1 of the drawing, which is an exploded perspective view of the holder of the invention, there is shown a flat decorative backing piece 10 in the form of a heart having an opening 11 therein. Fitting in the opening 11 is a substantially watertight receptacle 12 having an outer wall 12a and an inner wall 12b. The receptacle 12 is proportioned to fit in and extend through the opening 11 in backing piece 10 and has a radially outwardly extending rim 12c to engage the upper surface of the backing piece 10. A block of plastic foam 13 is proportioned to fit in the receptacle 12 and to be retained therein in proper position by a plurality of ridges 12d extending radially inwardly from the inner wall 12b of the receptacle. Alternatively to, or in addition to, the ridges 12d, there may be provided a stirrup 14 proportioned to engage the block 13 and having recesses 14a for detachably engaging apertures 12e in the rim 12c. The upper wall of receptacle 12 is planar and has a plurality of apertures 12f to drain excess water from the foam block supported therein.

In order to retain the receptacle 12 in the opening 11, there is provided a retaining ring 15 proportioned to slip over the lower portion of the receptacle 12 and engage the under surface of the backing piece 10, frictionally retaining the receptacle 12 in position with its rim 12c engaging the upper surface of the backing piece 10.

Figure 2:
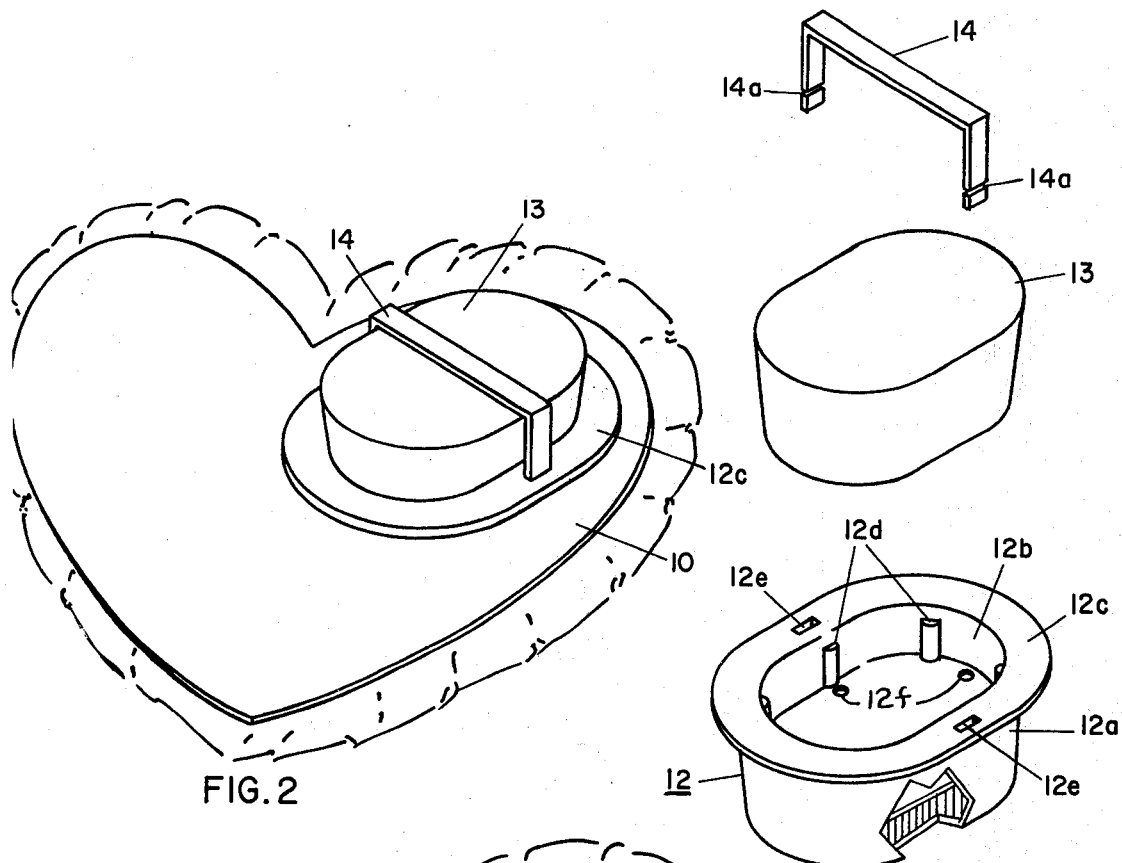
FIG. 2 is a perspective view of an assembled flower holder of FIG. 1.

After assembly of the decorative holder as shown in FIG. 2 with the foam block 13 saturated with water, flower stems may be inserted therein to form a decorative flower arrangement. As well known, the insertion of the flower stems in the saturated foam block retains their freshness for a considerable period of time. The rim 12c of receptacle 12 preferably extends from its upper edge, as shown, so that the bulk of the foam container portion is beneath the backing piece 10 and out of sight. As a consequence, the portion of the foam block in front of the backing piece is relatively low, so that the flowers inserted in the foam block will lie flat and close to the backing piece, creating a sleek and attractive floral piece.

While there has been described what is, at present, considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. A decorative holder for supporting flower arrangements comprising:
    a flat decorative backing piece having an opening therein;
    a substantially water-confining receptacle fitting in and extending through said opening for supporting a foam block and having extension means engaging the upper surface of said backing piece;
    means for retaining the foam block in a desired position in said receptacle;
    and means engaging said receptacle beneath said backing piece for retaining the same in said opening.

2. A decorative holder in accordance with claim 1 in which said receptacle is double-walled and includes at least one aperture in its upper wall to drain excess water from the foam block supported therein.

3. A decorative holder in accordance with claim 1 in which said extension means is a radially outwardly extending rim engaging the upper surface of said backing piece, the means for retaining the foam block in the receptacle comprises a stirrup, and the rim of said receptacle includes perforations for detachably engaging the ends of said stirrup.

4. A decorative holder in accordance with claim 1 in which the means for engaging said receptacle beneath said backing piece is a retaining ring frictionally engaging said receptacle beneath said backing piece.

* * * * *